United States Patent
Borg et al.

(10) Patent No.: US 6,479,753 B2
(45) Date of Patent: Nov. 12, 2002

(54) COAXIAL CABLE BUNDLE INTERCONNECTING BASE AND DISPLAYING ELECTRONICS IN A NOTEBOOK COMPUTER

(75) Inventors: John F. Borg, Fitchburg, MA (US); Michael D. Maddix, Pepperell, MA (US); Richard H. Plourde, Jr., Westminster, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/069,511

(22) Filed: Apr. 29, 1998

(65) Prior Publication Data

US 2002/0046868 A1 Apr. 25, 2002

(51) Int. Cl.[7] .............................. H01B 7/00; H01B 7/34
(52) U.S. Cl. ...................................... 174/113 R; 174/36
(58) Field of Search .................. 174/117 F, 102 R, 174/117 FF, 113 R, 106 R, 103, 120 R; 439/74, 63, 65, 66

(56) References Cited

U.S. PATENT DOCUMENTS

| | | | | |
|---|---|---|---|---|
| 2,623,093 A | * | 12/1952 | Smith | 174/106 |
| 3,636,234 A | * | 1/1972 | Wakefield | 174/36 |
| 3,649,744 A | * | 3/1972 | Coleman | 174/107 |
| 3,823,255 A | * | 7/1974 | La Gase et al. | 174/113 R |
| 4,408,089 A | | 10/1983 | Nixon | 174/36 |
| 4,470,898 A | * | 9/1984 | Penneck et al. | 252/511 |
| 4,499,438 A | * | 2/1985 | Cornelius et al. | 333/1 |
| 4,552,989 A | * | 11/1985 | Sass | 174/103 |
| 4,598,165 A | | 7/1986 | Tsai | 174/36 |
| 4,626,810 A | | 12/1986 | Nixon | 333/243 |
| 4,727,222 A | | 2/1988 | Sato | 174/108 |
| 4,871,883 A | | 10/1989 | Guiol | 174/36 |
| 5,043,530 A | * | 8/1991 | Davies | 174/36 |
| 5,118,905 A | | 6/1992 | Harada | 174/109 |
| 5,434,354 A | * | 7/1995 | Baker et al. | 174/36 |
| 5,457,287 A | * | 10/1995 | Shimozawa et al. | 174/102 R |
| 5,477,011 A | * | 12/1995 | Singles | 174/102 R |
| 5,516,294 A | * | 5/1996 | Andrews et al. | 439/63 |
| 5,574,250 A | * | 11/1996 | Hardie et al. | 174/36 |
| 6,007,347 A | * | 12/1999 | Keldsen et al. | 439/63 |
| 6,045,402 A | * | 4/2000 | Embo et al. | 439/579 |

FOREIGN PATENT DOCUMENTS

| | | | | |
|---|---|---|---|---|
| EP | 0393251 A1 | * | 10/1990 | H01R/23/70 |
| GB | 2187898 A | * | 9/1987 | H01R/11/11 |
| JP | 4-225600 | * | 8/1992 | H05K/13/05 |
| WO | WO 88/02560 A1 | * | 4/1988 | H01R/4/66 |

* cited by examiner

Primary Examiner—Dean A. Reichard
Assistant Examiner—William H. Mayo, III
(74) Attorney, Agent, or Firm—Fletcher Yoder & Van Someren (57) ABSTRACT

Disclosed is a coaxial cable bundle interconnecting a base and display in a notebook computer. The cable bundle includes outer cable layers surrounding a bundle of multiple cables. Each of the multiple cables includes a center conductor that is a 40 AWG wire surrounded by a dielectric medium. On top of the dielectric medium is a twisted served shield helically wrapped around the dielectric medium and the center core conductor.

66 Claims, 9 Drawing Sheets

LEGEND:

S = SIGNAL ROUTING LAYER

P = $V_{CC}$ POWER LAYER FOR DIGITAL CIRCUITS ON PCB

G = SYSTEM OR DIGITAL GROUND LAYER

FIG. 8

COAXIAL CABLE BUNDLE INTERCONNECTING BASE AND DISPLAYING ELECTRONICS IN A NOTEBOOK COMPUTER

BACKGROUND OF THE INVENTION

This invention relates generally to electronics and more particularly to the problem of reducing electromagnetic interference (EMI) signal radiation in cables.

A computer system, such as a personal computer or notebook computer, emits EMI radiation and other electronic "noise" due to the electronic components included in the computer system. Various threshold values defining acceptable levels of EMI radiation from a computer system have been established, for example, by governmental agencies. To be EMI-compliant in accordance with these established EMI radiation limits, computer manufacturers have taken steps to minimize EMI radiation levels emitted from various components of computer systems. For example, a special metallic casing may be used over a liquid crystal display (LCD) device, or a special metallic paint may be used on the inside of computer casings to minimize EMI emissions. EMI radiation is also emitted from wires and cables used in a computer system to interconnect various components, such as to connect a display device to the motherboard. Various techniques are used to reduce EMI emissions from the cables. However, special considerations must be taken when reducing the EMI radiation of the cables included in the smaller notebook computer systems.

Physical constraints exist when considering the smaller computer systems being developed today, such as the thin notebooks and laptop computers, that are not typically constraints in the conventional personal computer system. For example, when electrically connecting, with a cable, a component in the top portion of the notebook to another component in the bottom portion, an additional constraint is the constant, sharp, bending which occurs at the crease where the top and bottom meet as the notebook is opened and closed. This is not a constraint in a conventional personal computer system having a separate monitor and processor. An additional constraint in the smaller notebook computer systems is the smaller amount of space, for example, of openings through which cables pass, and for housing the components. In other words, due to the density of the overall packaging of the computer system components in a notebook computer, there is little free space, for example, for cable routing. The relevance of these additional constraints, which must be considered when attempting to reduce EMI emissions in the cables used in notebook computer systems, is described in paragraphs below.

One type of cable typically used in computer systems is "flexprint" cable used to connect, for example, a transmitter on the motherboard to a receiver included in the LCD device. The transmitter is located in the bottom portion of the notebook computer and the receiver is located in the top portion of the notebook computer. Generally, a flexprint cable includes multiple signal conductors surrounded by flexible layers of insulating tape, such as a mylar tape. One drawback with using the flexprint cable in the small, thin, notebook computers when connecting a component in the top portion to another component in the bottom portion is that the flexprint cable is often not flexible enough. Constant bending of the flexprint cable within the casing at the crease where the top and bottom of the notebook meet, as when the notebook is opened and closed, typically causes cable conductors in the flexprint cable to fracture over time. Another drawback is that EMI radiation levels are often not reduced enough with the flexprint cable at the high data transfer rates, for example, above 650 megabits/second, and increased frequencies with newer display devices, such as an 'XGA' or 'SXGA' display device. Examples of the increased frequencies in this range typically include a fundamental operating frequency at or above 65 MHZ with harmonics in the 10× range of 650 MHZ. Typically, an 'XGA' device has a resolution of 1024 by 768 pixels, and an 'XSGA' device has a resolution of 1280 by 1024 pixels.

Another type of cable typically used in computer systems to electrically connect components is a shielded cable or wire, such as copper. These types of cables using shielded wire include a point-to-point wire connection, a twisted wire pair, or a standard coaxial cable. Typically, the point-to-point and twisted wire pair are in the general size range of 22–30American Wire Gauge (AWG), and the coaxial cable is generally greater than 20 AWG . One drawback with using wires of this type is that they are often too large to be used in small notebook computer systems given the previously described density and housing of computer components. Wires of this type may be too large in notebook computers in two respects. First, when electrically connecting two components having a high data transfer rate, the number of interconnecting wires required for the electrical connection often exceeds the size of the opening. For example, when electrically connecting for data s transfer the data receiver of the LCD, located in the top portion of the notebook, to the transmitter on the motherboard in the bottom portion of the notebook, the cumulative size of all the wires required to transmit the necessary data often exceeds the narrow openings allowed for the connection. Secondly, even if the total number of interconnecting wires is reduced, the existing wires plus necessary shielding still often render the wires too large for use in a notebook computer.

Still another drawback using shielded wires, as with the flexprint cable, is that EMI radiation levels are not sufficiently reduced with some wire cable configurations when using the high data transfer rates and increased frequencies.

Thus, there is required an efficient technique for providing electrical connections between computer components which minimizes EMI radiation emissions, has a high degree of physical flexibility, and requires a minimum amount of space.

SUMMARY OF THE INVENTION

In accordance with principles of the present invention, a cable bundle used in a notebook computer is disclosed. The cable bundle is used for data transmissions between a transmitter in the bottom portion of the notebook computer, and a receiver in the top portion of the notebook computer. The cable bundle includes multiple coaxial cables each transmitting an electrical signal, and one or more outer cable layers surrounding the coaxial cables. Each of the coaxial cables in the cable bundle further includes an inner conductor portion, a dielectric medium surrounding the inner conductor portion, and a twisted served shield helically wrapped around the dielectric medium.

In accordance with another aspect of the invention, disclosed is a cable bundle used in data transmissions in which the cable bundle includes multiple cables each transmitting an electrical signal, and a layer of neoprene rubber tubing. The layer of neoprene rubber tubing also includes particles with magnetic properties suspended in a rubber binder material.

Thus, there is provided an efficient technique for providing electrical connections between computer components which minimizes EMI radiation emissions, has a high degree of flexibility, and requires a minimum amount of space.

BRIEF DESCRIPTION OF THE DRAWINGS

The above-mentioned other features of the invention will now become apparent by reference to the following description taken in connection with the accompanying drawings, in which.

DESCRIPTION OF THE PREFERRED EMBODIMENT

Figure 1A:
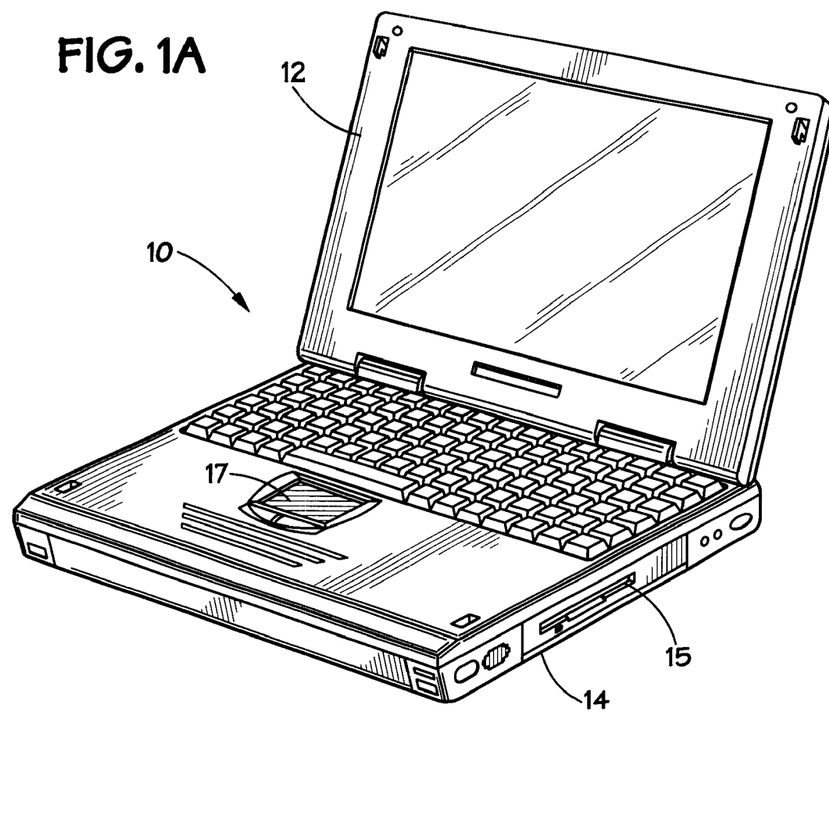
FIG. 1A is an example of an embodiment of a computer system.

Referring now to FIG. 1A, shown is an example of an embodiment of a laptop computer system which includes a top portion (12) and bottom (14). In a laptop computer, as shown in FIG. 1A, the top portion (12) is connected along a hinge to the bottom portion (14). The top portion (12) typically includes a display screen, such as an 10 ns LCD (liquid crystal display), and the bottom portion (14) typically includes such electronic components as the motherboard and related printed circuit boards, and includes items such as the mouse and the keyboard. Generally, all electronic components are housed within the bottom portion of the computer system (14).

Figure 1B:
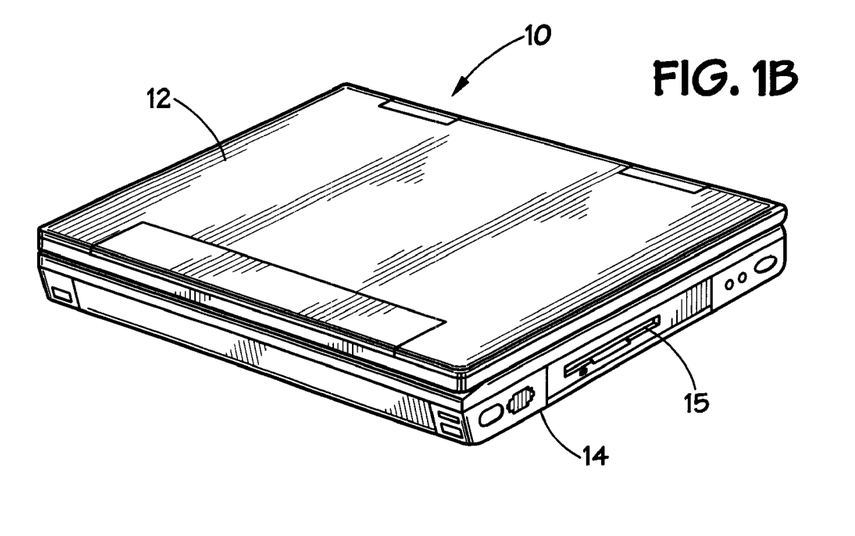
FIG. 1B is an example of the embodiment of the computer system of FIG. 1A, shown in the closed position with the top portion of the computer down.

Shown in FIG. 1B, is an example of an embodiment of the computer system of FIG. 1A, with the top and bottom portions shown in the closed position. It should be noted that FIG. 1A is typical of an example of a laptop computer in the open or useable position when the user wishes to use the computer system (10). FIG. 1B is the typical closed position, such as when the laptop is not in use or is being transported. In this preferred embodiment, the combined thickness of the top portion (12) and the bottom portion (14) in the closed position is approximately 1 3/8 inches. Other preferred embodiments may have other combined thickness dimensions.

Figure 2:
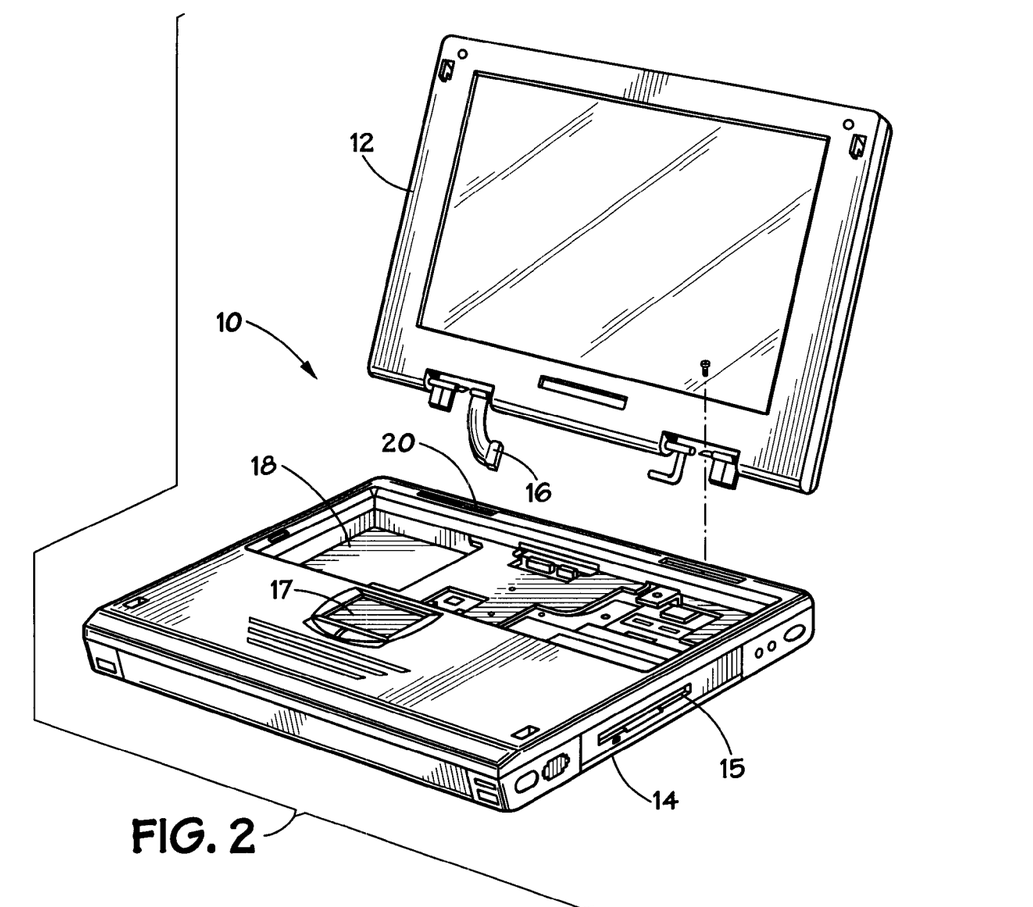
FIG. 2 is an example of an embodiment of the computer system of FIG. 1A shown in more detail.

Referring now to FIG. 2, shown in more detail is an example of the embodiment of the computer system (10) of FIG. 1A in the open position. In particular, FIG. 2 shows an example of how the top portion(12) and the bottom portion (14) are attached. The LCD screen included in the top portion (12) is electrically connected to the bottom portion (14) through the use of the cable (16), which passes through an opening (20) in the bottom portion (14). As previously mentioned, various computer components are included in the bottom portion (14). For example, a disk drive (15) and a mouse pad (17) are included in the bottom portion (14) of the computer system (10). Addition computer components, such as the mother board and other printed circuit boards, are layered within the bottom portion (14) of the computer system (10). For example, the opening slot (18) may be the location to insert an item such as the keyboard to plug in to use in the computer system (10), or it may be the location to insert an additional board containing memory. In turn, anything placed in the slot opening (18) is layered on top of other components (not shown) included beneath the location of the opening slot (18) in the bottom portion (14) of the computer system (10). Components within the bottom portion (14) of the computer system (10) tend to be very densely packed and space is at a premium since one of the goals of personal computing, particularly with laptops, is to have minimum weight and minimum size. For example, the opening (20) through which the cable bundle, as used in data transmission, passes to connect the top portion (12) to the bottom portion (14) is typically a very small opening in a laptop computer. Additionally, the opening (20) is in a location at the hinge where the top and bottom portions meet. When the computer system is opened and closed, as often done in common operation, the cable bundle must be of sufficient flexibility to sustain this common operation. Thus, the cable bundle disposed in this location (20) must be highly flexible as well as be able to fit in the small opening (20). The opening slot (20) through which the cable bundle passes has an approximate minimum width of 5.8 mm (0.228 inches).

Figure 3A:
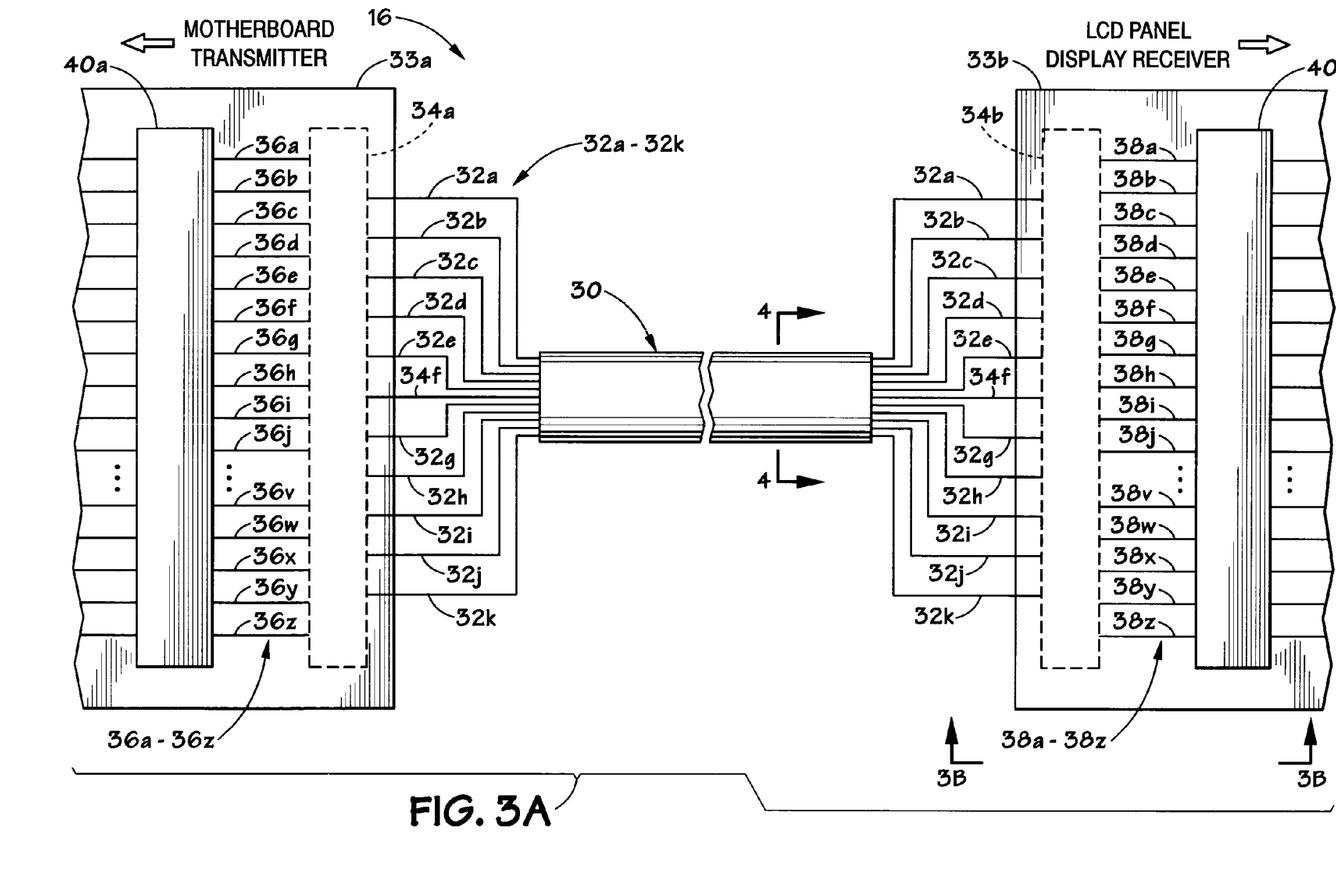
FIG. 3A is a plan view of an example of an embodiment of a cable bundle used for data transmission between the top and bottom portion of the computer system of FIG. 1A.

Referring now to FIG. 3A, shown is an example of an embodiment of an enlarged plan view of the cable bundle (16) from FIG. 2. In this particular embodiment, the cable bundle (16) is used in data transmissions between a transmitter, as may be included in the motherboard which is housed in the bottom portion (14) of the computer system (10), to a receiver, which is housed in the top portion (12) of the computer system (10). In particular, the receiver is part of the LCD display unit. Additionally shown in FIG. 3A are the electrical connections of the various individual cables included within the cable bundle, termination strips, and pin connectors. The cable bundle (16) includes outer cable layers (30), which will be described in more detail in following sections. The cable bundle (16) further comprises multiple cables (32a–32k). Generally, each of the cables (32a–32k) includes a 40 AWG center conductor surrounded by shielding layers. This also will be described in more detail in paragraphs that follow.

The plan view of FIG. 3A is a top or downward view showing the top side of printed circuit boards (PCBs) (33a, 33b) and portions of the cable bundle to be electrically connected to the motherboard transmitter and the LCD receiver, respectively. Mounted on the top side of PCB (33a) is pin connector (40a). Mounted on the underside of PCB (33a) are one or more termination strips (34a). Each of the termination strips (34a), as will be further described in following paragraphs, serves as a common point for electrically connecting signals. Each of the signal lines or cables (32a–32k) contains a shielding layer, which is terminated at one or more termination strips (34a). The center conductor of each of the signal lines (32a–32k), as well as a voltage or other signals from the termination strip, are subsequently electrically connected to the pin connector (40a) via pin connector lines or conductive paths (36a–36z). The arrangement of PCB (33b) is similar to that of PCB (33a), with the exception that PCB (33b) provides electrical connections of the various signal lines (32a–32k) to an LCD receiver contained in the top portion (12) of the computer system (10).

It should be noted that a preferred embodiment of the cable bundle (16) may include any number of cables or signal lines (32a–32k). Similarly, the number of electrical connections or pin connector lines, as indicated in FIG. 3A (36a–36z), also vary with embodiment dependent upon the number of electrical connections required.

Figure 3B:
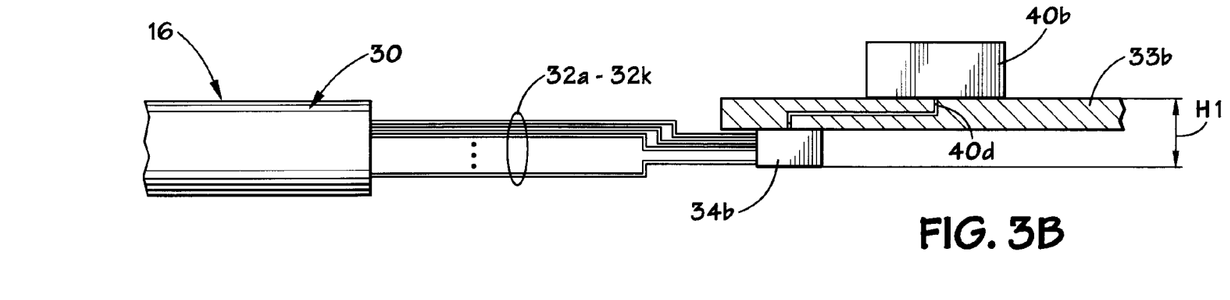
FIG. 3B is an enlarged side view of the cable bundle and printed circuit boards (PCBs) of FIG. 3A.

FIG. 3B shows an enlarged side view of the cable bundle (16) and PC board (33b) as previously shown in FIG. 3A. The cable bundle (16) is shown as including the outer cable layers (30) and cables (32a–32k). PCB (33b) is shown as having mounted on the top side pin connector (40b) and on the underside, one or more termination strips (34b). The center conductors of the various cables (32a–32k), as well as the shielding layer of cables (32a–32k), are electrically connected through vias 40d in PCB (33b) to pin connector (40b). Vias, or plated through-holes, are generally electrical conductive paths within layers of a PCB forming electrical connections between two points in the PCB. As previously described, the shielding layers of the cables or signal lines (32a–32k) are terminated at termination strip (34b). The center conductors of the cables or signal lines (32a–32k) are then electrically connected to pin connector (40b) through vias in (33b). Additionally, signals terminated at termination strip (34b) are electrically connected to pin connectors (40b) as required in accordance with the particular embodiment similarly using vias 40d through PCB (33b).

Figure 3C:
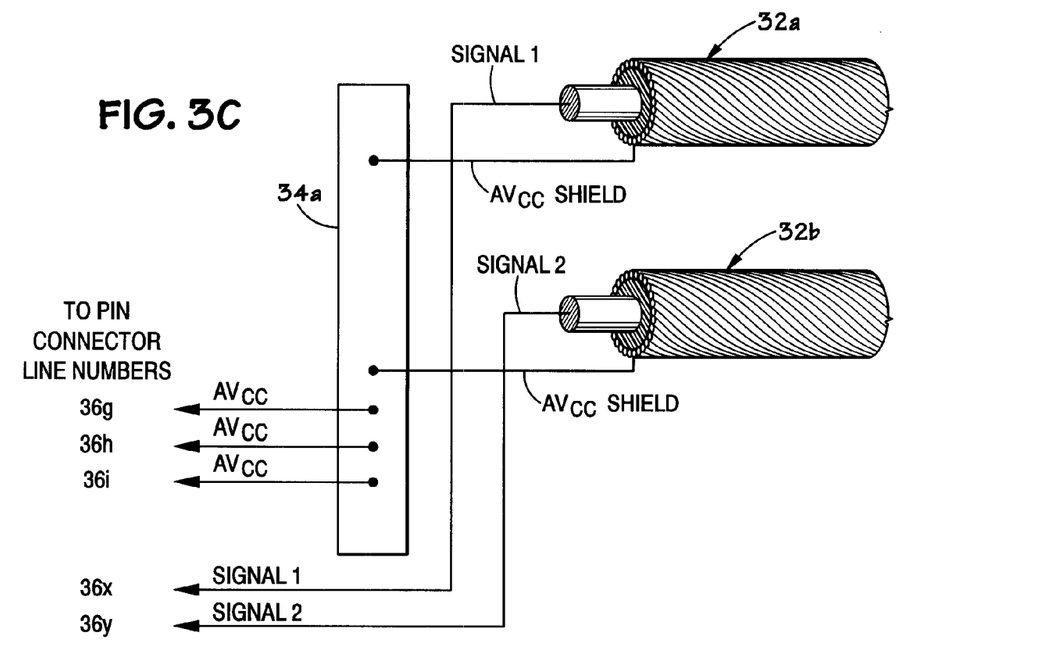
FIG. 3C is an enlarged view of how the cables of the cable bundle of FIGS. 3A and 3B are electrically connected to the termination strips and the pin connector lines.

Referring now to FIG. 3C, shown is an example of an embodiment of an enlarged logical view of how each of the cables or signal lines (32a–32k) are electrically connected to the termination strips and the pin connector lines. Shown in FIG. 3C are two cables (32a, 32b). Cable or signal line (32a) contains a center conductor with a first signal, SIGNAL-1, transmitted through the center conductor. Signal line (32a) has a shielding layer with analog VCC (AVCC) as the shielding signal. This AVCC shielding signal is shown as being electrically terminated or connected to termination strip (34a). Similarly, line (32b) contains a center conductor transmitting SIGNAL-2 through its center conductor. Similar to line (32a), line (32b) includes an AVCC shielding signal, which is terminated at termination strip (34a). The center signal line conductors of cables (32a, 32b) are electrically connected to the appropriate pin connector (36x, 36y). Additionally, pin connectors (36g–36i) require the AVCC signal and are, therefore, electrically connected from the termination strip to the appropriate pin connectors through vias included in the PCB (not shown).

Figure 4:
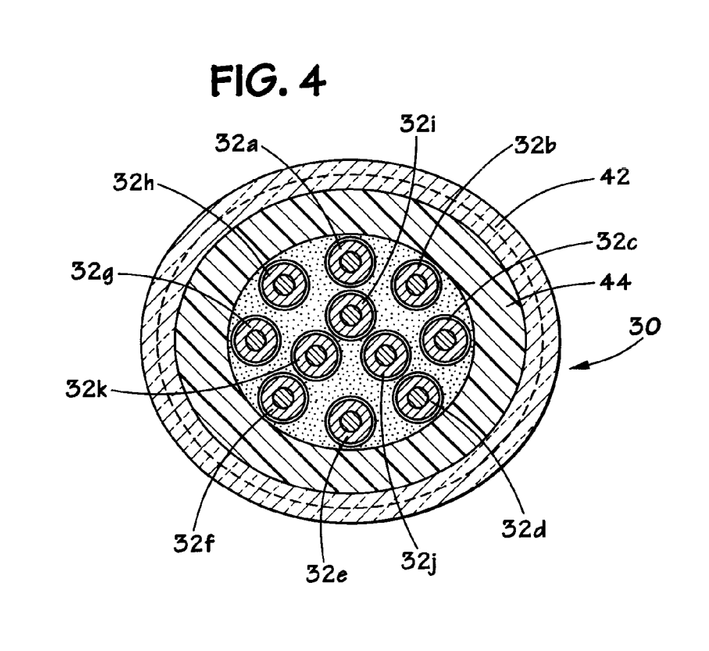
FIG. 4 is an enlarged cross-sectional view of the cable bundle taken along line 3B—3B of FIG. 3A.

Referring now to FIG. 4, shown is an example of an embodiment of a cross-sectional view of the cable bundle (16) of FIG. 3. As shown in FIG. 4 in this particular embodiment of the cable bundle (16), the outer layer (30) includes two wraps of fabric tape (42) and neoprene rubber tubing (44). Additionally, as previously described, the inner portion of the cable bundle (16) includes a number of cables or signal lines. In this particular embodiment, the cables are coaxial cables. In another preferred embodiment, the coaxial cables are additionally twisted three times around the center of the cable bundle.

The outer layers (30) of the cross-sectional view of the cable (16) are used to reduce EMI emissions from the data transmissions in the cable lines (32a–32k). In this particular embodiment, the neoprene rubber tubing (44) is comprised of various ferrous (or magnetic) materials in a fine powdered form suspended in a rubber material. The suspended magnetic materials in the rubber material are iron powder, iron oxide powder, and ferrite particles. The rubber tubing in this embodiment is produced by Capcon International, Inc.™, and is highly flexible. The rubber tubing induces EMI loss within the cable bundle by containing the flux and dissipating it as heat. Generally, a preferred embodiment has a neoprene rubber tubing (44) comprising particles with magnetic properties suspended in a rubber binder material. The particles with the magnetic properties may include, for example, iron oxide. The rubber binder material, for example, my be silicon rubber or neoprene or such other materials similarly known to those skilled in the art.

The two wraps of fabric tape (42) are made with a tape which is flexible and provides an additional shielding layer to the cable (16). In a preferred embodiment, the tape is typically a conductive fabric tape. For example, in one preferred embodiment, the fabric tape is nickel plating over a copper-woven fabric, such as the tape supplied by E-power™, a Taiwan-based manufacturing company. Alternatively, a nonconductive tape may be used. For example, an alternate embodiment may use a polytetrafluoroethylene (Teflon™) tape or other tape which is generally thin and flexible. Those skilled in the art will know of additional equivalents and substitutes to be used for fabric tape containing the previously described properties.

It should be noted that emissions levels were measured using various preferred embodiments in which the tightness of the weave of the fabric tape varied with preferred embodiment. Tests showed that, generally, lower emissions levels were associated with preferred embodiments using a fabric tape having a tighter weave.

The cable and cable bundle of this embodiment have typical physical dimensions that will now be described. The maximum diameter of the cable bundle is approximately 5.0 mm (0.196 inches). The nominal wall thickness of the neoprene rubber tubing (44) is approximately 1.20 mm (0.048 inches). The approximate diameter of each cable is 0.33 mm (0.013 inches). Additionally, the approximate thickness of the wrapped conductive tape is 0.55 mm (0.020 inches). It should be noted that other preferred embodiments may have varying measurements than those stated.

Figure 5A:
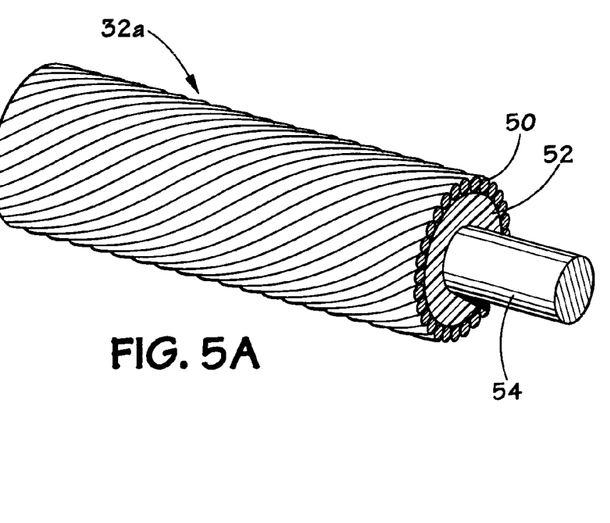
FIG. 5A is an enlarged cross-sectional view of one of the cables shown in FIG. 4.

Referring now to FIG. 5A, shown is an example of an embodiment of an enlarged view of one of the cables (32a–32k). Each of the cables in this particular embodiment, such as (32a), includes a center conductor (54) surrounded by a dielectric medium (52), which is further layered with a twisted served shield helically wrapped around the body of the dielectric medium and center conductor. Each of the center conductors (54) carry various signals that will be described in more detail in paragraphs that follow. Additionally, the served shield (50) helically wrapped around the body of each of the 40AWG wires serves as an electrical shield to further reduce EMI emissions. An electrical signal passes through the shielding layer (50) of each of the cables as will also be described in more detail in paragraphs that follow. The signals which pass through the shielding (50) are those signals previously described, such as AVCC, which were terminated to the termination strips such as (34a, 34b). Those skilled in the art will know that other signals, such as analog ground (AGND) or digital ground (DGND), may be used as a shielding signal in the cables.

Figure 5B:
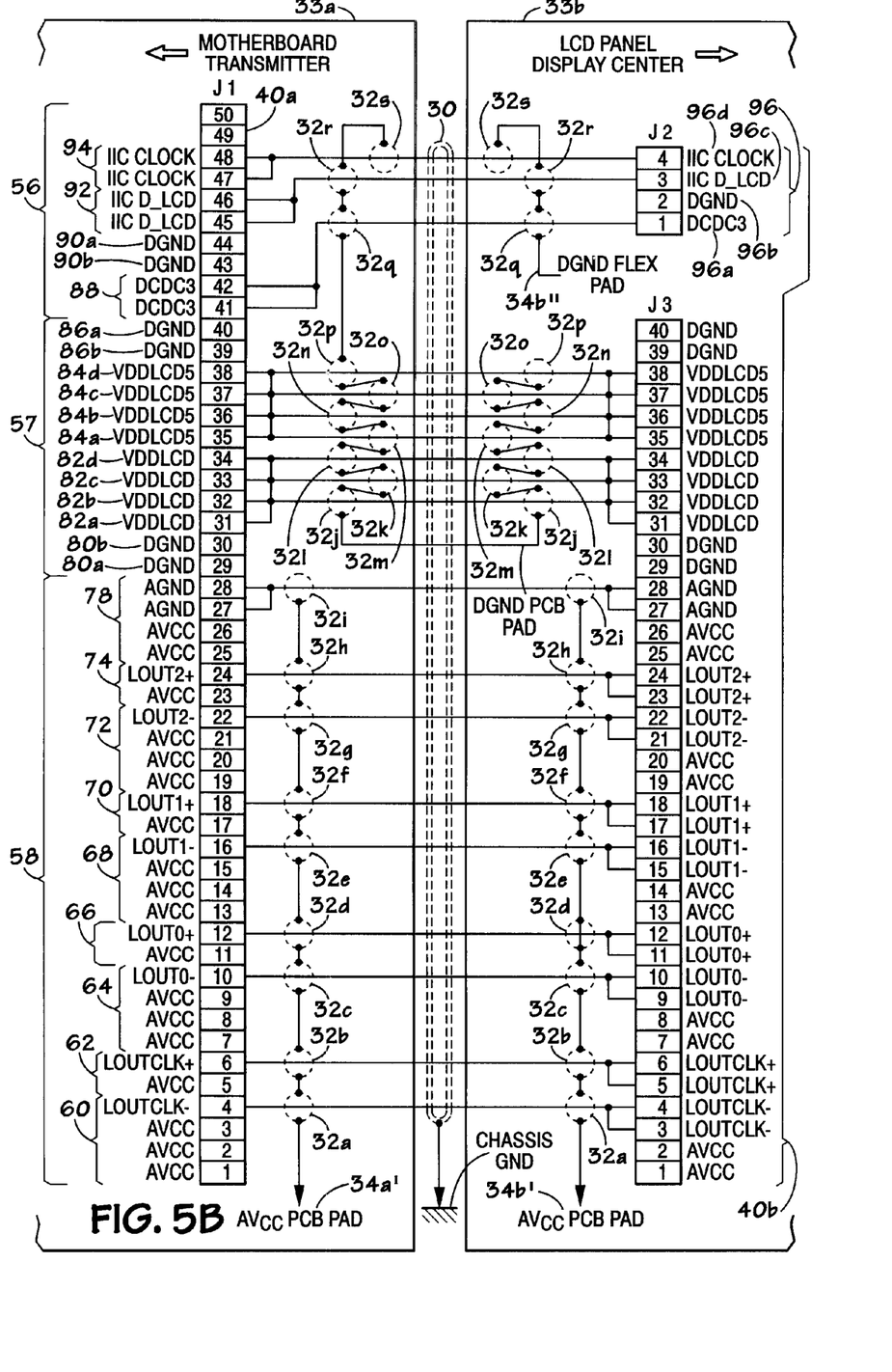
FIG. 5B is an example of an embodiment of a wiring and pin diagram for the cable bundle shown in FIG. 3A.

Referring now to FIG. 5B, shown is an example of a wiring diagram used in a preferred embodiment of the cable bundle (16). This particular embodiment includes nineteen cables or signal lines in the cable bundle (16). Note that these signal lines or cables are analogous to those previously described as cables or signal lines (32a–32k). FIG. 5B is partitioned into two sections, a left portion, which describes those electrical connections between the cable bundle, PCB 33a, and the motherboard transmitter, and the right portion, which contains those electrical connections between the cable bundle, PCB 33b, and the LCD panel display receiver, as contained in the top portion (12) of the computer system (10) of FIG. 1. This particular embodiment includes nineteen cables or signal lines carrying signals which can be generally partitioned into three sections. Section (58) includes nine signal lines carrying data and clock signals and an additional analog ground (AGND signal). Section (57) includes seven signal lines providing power to the LCD panel display receiver. Section (56) includes three signal lines providing status display signals to the LCD panel display receiver.

FIG. 5B is a wiring or pin diagram showing, for example, on the left-hand side, pin connections for the pin connector (40a). The pin connector (40a) has fifty pin connections in this particular embodiment. Similarly, on the right-hand side, the pin connector (40b) consists of two physical pin connections labeled as J2 and J3. Connector J2 contains those signal lines previously described as status display signals as contained in group (56).

Each of the previously described cables or signal lines, such as (32a,32b) for example, are graphically illustrated as circular rings in FIG. 5B. Each of the lines, such as (32a), contains a center conductor signal, such as LOUTCLK- and a shielding signal, such as AVCC. For the lines contained in group (58), the combined center conductor signal and shielding signal are graphically represented in individual groups such as (60–78). In this particular embodiment, the shielding for all of the signal lines contained in group (58) is the AVCC signal. The termination of each of the shielding signals is shown as element (100a), which shows all of the lines (32a,32i) shielding terminated to the AVCC PCB pad (34a') located on PCB (33a). Similarly, located on PCB (33b) is a termination strip AVCC PCB pad (34b') for terminating the lines (32a–32i) on PCB (33b) located on the top portion (12) of the computer system (10) for sending signals to the LCD panel display receiver.

The signal lines contained in group (57) are various power signals. Each of the signals (82a–84d) sent on signal lines (32j–32p) are shielded with digital ground (DGND). The shielding for lines (32j–32p) are wired on termination strip (100c) for the digital ground. In this preferred embodiment, there is a termination strip 100c on each of the PCBs similar to the previously described AVCC termination strips. However, for clarity, both of these are not shown in the figures, but rather logically designated as the DGND PCB PAD in FIG. 5B. It should be noted that the signal supply to pins (29,30,39,40) in connector (40a) are electrically connected to a particular ground layer (G-layer) in the printer circuit board as will be described in conjunction with FIG. 7.

The signal lines included in group (56) are status display signal lines (32q–32s). Items (88,92,94) are similarly grouped as those previously described in section (58). The electrical connection supplied to pins (43,44) is a DGND signal which is electrically connected to a layer of the PCB similar to pin connections (29,30,39,40) as previously described in conjunction with section (57).

Shown on the right-hand portion of FIG. 5B are similar pin connections for the LCD panel display receiver pin connectors J2 and J3. In this particular embodiment, there are actually two physical pin connectors J2 and J3, which are included in the previously described pin connector element (40b). Element (34b') is the termination strip for the digital ground (DGND) electrical connections, which serve as the shielding signal for lines (32q–32s) on PCB (33b).

It should be noted that the number of pin connections needed varies with application. Additionally, the number and location of signal lines, and the various signals combined and used in the center conductor and shielding vary with application. It should also be noted that in preferred embodiments, the order and position of the pins and the signal lines are important. For example, for shielding and signal integrity reasons, the AVCC, AGND, and DGND signals should be placed between adjacent signals, as in FIG. 5B. The exact positioning of the signal lines may vary with other preferred embodiments depending on, for example, the number and type of signal lines.

Figure 5C:
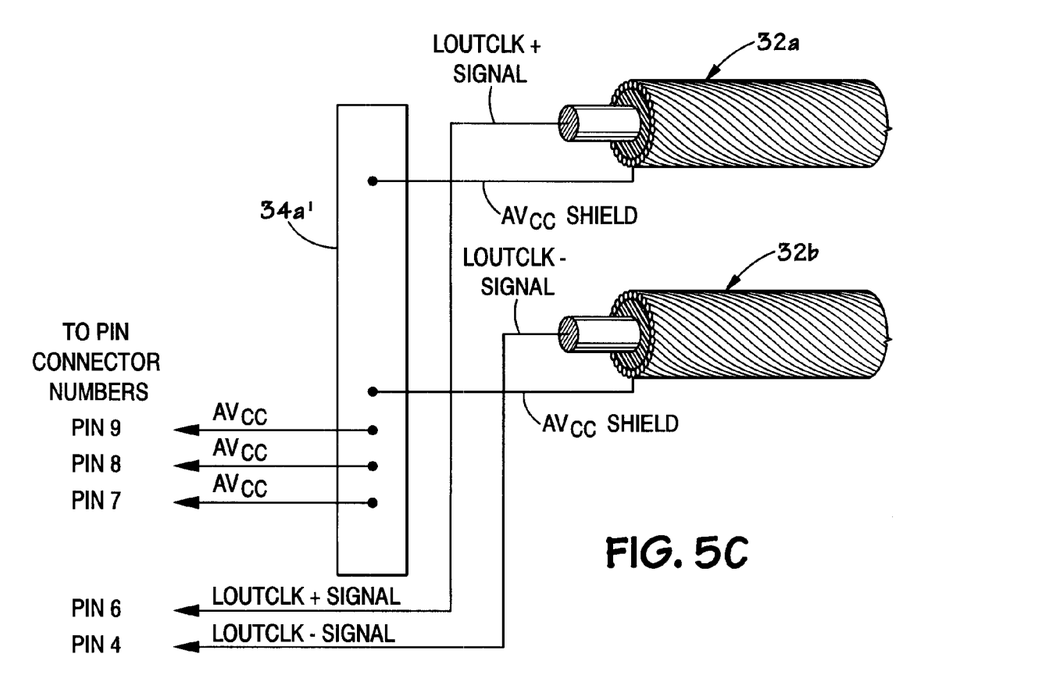
FIG. 5C is an example of an embodiment of an enlarged view of the logical termination and pin connections of the shielded cables contained in the cable bundle of FIG. 3A.

Referring now to FIG. 5C, shown is an example of the logical connection of two of the cables or signal lines (32a,32b) and how they are electrically connected to various pin connectors and termination strips in this preferred embodiment using the pin diagram of FIG. 5B. It should be noted that this diagram is similar to that which was generally described in FIG. 3C. However, FIG. 5C includes specific pin numbers and center conductor signal names as shown in FIG. 5B. For example, line (32a) contains a center conductor carrying LLCLK- signal in its center conductor, which is electrically connected to pin (4) on PCB (33a-not shown). The AVCC shielding layer of line (32a) is gang-terminated to strip (34a'). In other words, the AVCC shielding layer of lines (32a), and other signal lines, is stripped back from the remaining portions of each cable. The shielding layers of all such lines having the AVCC shielding are subsequently terminated to the same termination strip. Similar pin connections from conductor lines and shielding lines are shown for line (32b).

It should be noted that in this particular embodiment, the termination process is a special termination process performed by Vermont Electromagnetic Corporation (VEMCO)™ and Sumitomo™. The termination process of the various signal lines or cables, including shielding signals, in this particular embodiment is of importance in several respects. First, only certain manufacturers, such as those listed, have been found to be able to terminate in a production mode configuration the tiny 40AWG wires required in this particular embodiment. Additionally, a pin connector is the typical way of terminating wires. However, in this preferred embodiment, such a connector could not be used for termination due to a size constraint and the design of the notebook computer system (10), such as the Digital HiNote Ultra 2000 notebook computer.

Referring back to FIG. 3B, in this preferred embodiment, the height of the termination strip (34b) or other equivalent used to terminate wiring has to be less than one millimeter. If a second connector were used to terminate wiring rather than the termination strip process in (34b), the height indicated as H1 in FIG. 3B would be exceeded. Since no connector could be found to terminate the signals meeting this height restriction, H1, a gang-termination process is used. To exceed the height of H1 and use the second connector would require a redesign of many of the components of the bottom portion (14) of the computer system (10) due to the compact and dense housing of the computer components. As known to those skilled in the art, "gang-termination" process is typically a metallic conductive strip to which multiple various electrical connections are terminated through a process, for example, such as soldering. As previously described, due to the large number of fine small 40AWG wires included in the cable bundle, a specialized termination process is used as supplied by VEMCO and Sumitomo in a manufacturing production environment.

Figure 6:
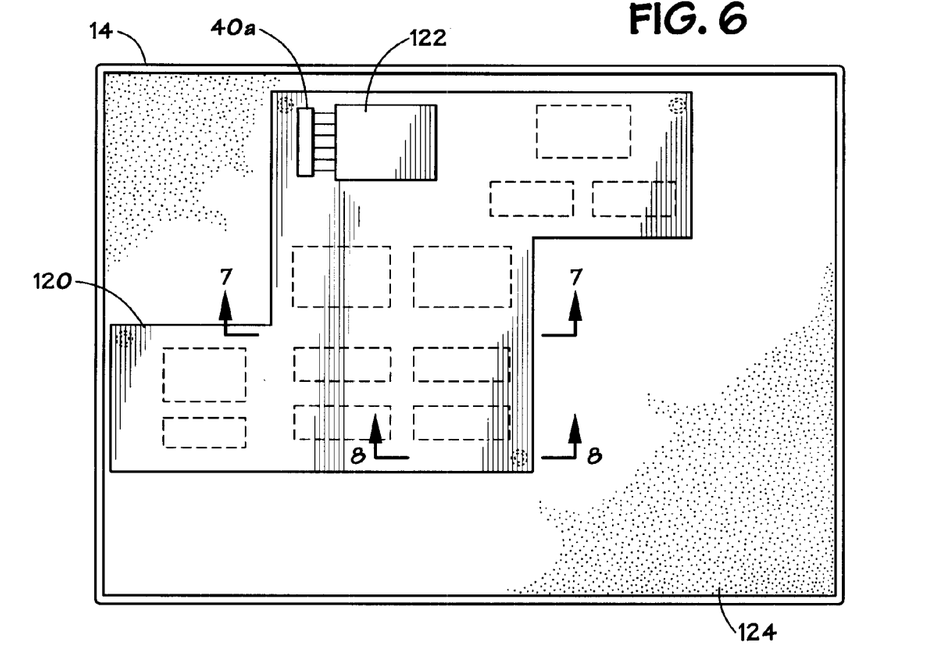
FIG. 6 is a plan view of an example of an embodiment of the motherboard and other electrical components shown in the computer system displayed in FIG. 1A.

Referring now to FIG. 6, shown is an example of an embodiment of a plan view of the bottom portion (14) of the computer system (10). In particular, included in FIG. 6 are certain electrical components relevant to a discussion of cable (16), shown in FIG. 2. The bottom portion (14) of the computer system (10) is shown as containing a metallic painted bottom of the case (124) and a motherboard (120). Included on the motherboard (120) is a pin connector (40a) electrically connected to a transmitter (122). The pin connector (40a) are those pin connections, for example, as described in FIGS. 3 and 5B. It should be noted that additional components are included in the bottom portion (14), however, for the sake of clarity, they are omitted in this diagram.

Figure 7:
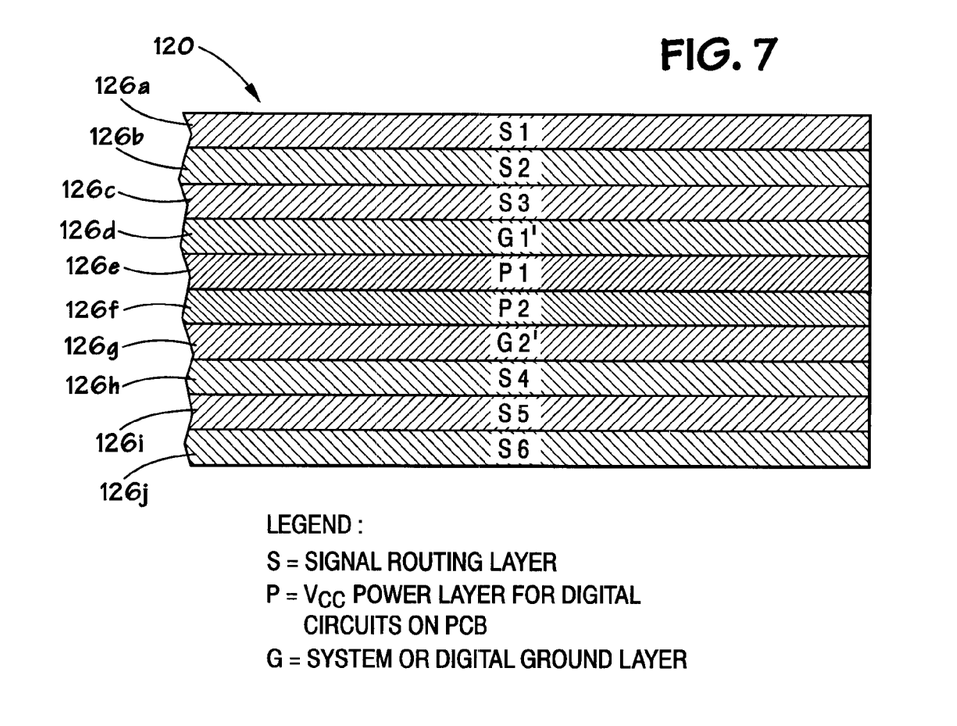
FIG. 7 is an example of an embodiment of an enlarged cross-sectional view of the motherboard shown in FIG. 6.

Referring now to FIG. 7, shown is an example of an embodiment of an enlarged cross-sectional view of the motherboard (120). The motherboard (120) is a printed circuit board (PCB) comprising nine layers (126a–126j). Three signal routing levels (126a–126c) comprise the top three layers of PCB (120). The fourth layer (126d) is layer G1, which is a system or digital ground (DGND) layer. The fifth layer (126e) is a power layer P1, which contains VCC power for digital and analog circuits on the motherboard (120). Similarly, layer six (126f) is power layer P2, also supplying power for various circuits mounted on PCB (120). The seventh layer (126g) is a system or digital ground (DGND) layer G2. Similar to layer G1, layer G2 is used for grounding various electrical components mounted on PCB (120). The bottom three layers (126h–126j) are also signal routing layers, similar to the previously described top three layers S1–S3. Each of these layers will be described in more detail in paragraphs that follow. It should be noted that, as known to those skilled in the art, insulating layers, such as fiberglass (not shown) are typically placed between each of the layers of FIG. 7.

Figure 8:
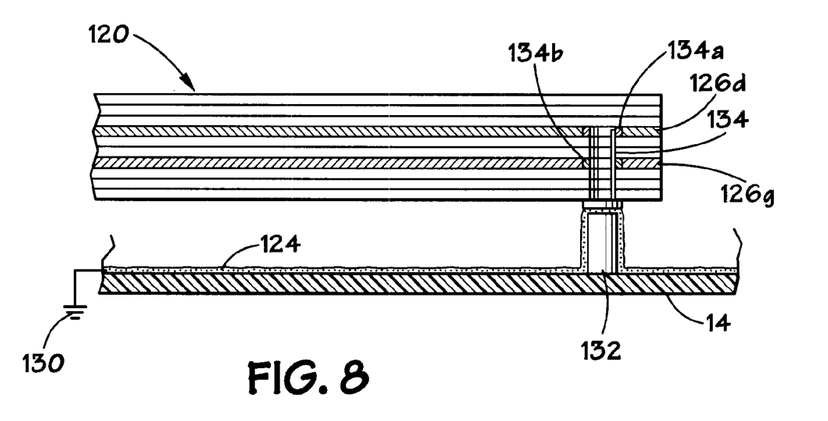
FIG. 8 is an example of an embodiment of how the motherboard is included in the computer system of FIG. 1A.

Referring now to FIG. 8, shown is a cross-sectional side view of an example of how the motherboard (120) may be electrically grounded and connected to the case bottom (14) Generally, FIG. 8 describes the relationship between the various groundings, such as digital ground (DGND) in layers GI and G2 to system ground. In other words, it describes how digital ground is tied to system ground. As previously described, the bottom portion (14) of the case is coated with a metallic paint (124). The metallic paint layer (124) provides the electrical system ground (130) for the computer system (10). Also located underneath the layer of metallic paint is a small metallic post (132). Various corners of the motherboard (120) are electrically connected or tied into system ground, such as by mounting the motherboard on the various metallic posts to ground the various electrical layers of the motherboard (120). For example, digital ground layers G1 and G2 contain metallic plated holes (134a,134b). Using vias, layers G1 and G2 are electrically connected (134) to system ground using conductive plated through-holes.

Figures 9, 10:
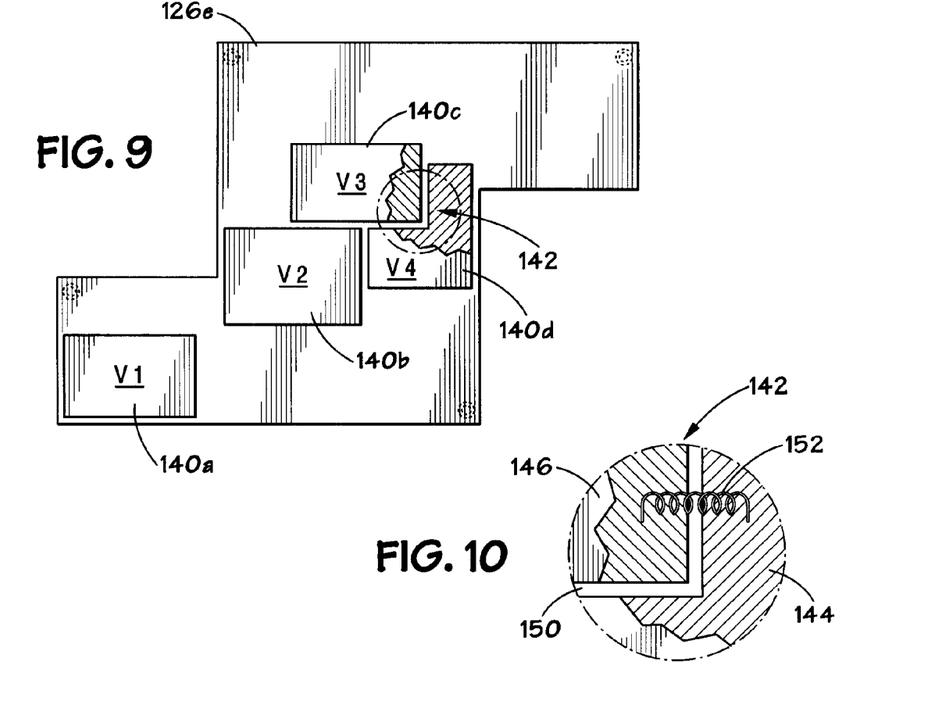
FIG. 9 is an example of an embodiment of a plan view of one of the P(power)layers of the motherboard.
FIG. 10 is an example of an embodiment of an enlarged area shown in FIG. 9 for one of the P layers.

Referring now to FIG. 9, shown is a plan view of a power layer, such as P1 (126e) or P2 (126f) of the motherboard (120) of FIG. 7. Typically, each power layer or VCC layer contains several different voltages, as designated in FIG. 9 by fields (140a–140d). Each of the various voltage areas, V1–V4, provides power for various devices such as analog or digital devices located on motherboard (120). Electrical connections from layer (126e) are made to the various devices mounted on top of layer S1 (126a) of FIG. 7, for example, through electrically conductive connections or vias, as known to those skilled in the art.

Referring now to FIG. 10 is an enlarged view of area 1 (142) of FIG. 9, which includes portions voltage areas V3 and V4. The enlarged view of area 1 (142) includes a portion of area V3, which is AVCC, analog power for the analog devices located in area V3. Also included in area 1 (142) is a portion of V4 (144), which is a non-zero voltage, serving as a power source for digital devices mounted on PCB (120). One or more inductors (152) connects the various voltage areas, such as V3 and V4, to dampen any noise effect between the various voltage areas, as known to those skilled in the art. Additionally, included in area 1 (142) is power plane separator (150), which serves as a physical separator or barrier of the various voltage areas. It should be noted that various materials and techniques known to those skilled in the art may be used to separate the various voltage areas located on a power layer. Similarly, an inductor, or other such equivalent such as ferrite beading, is typically used to provide electrical connections on the signal layers that traverse the various voltage areas to dampen any noise effects produced by signals of the various voltage areas.

Figure 11:
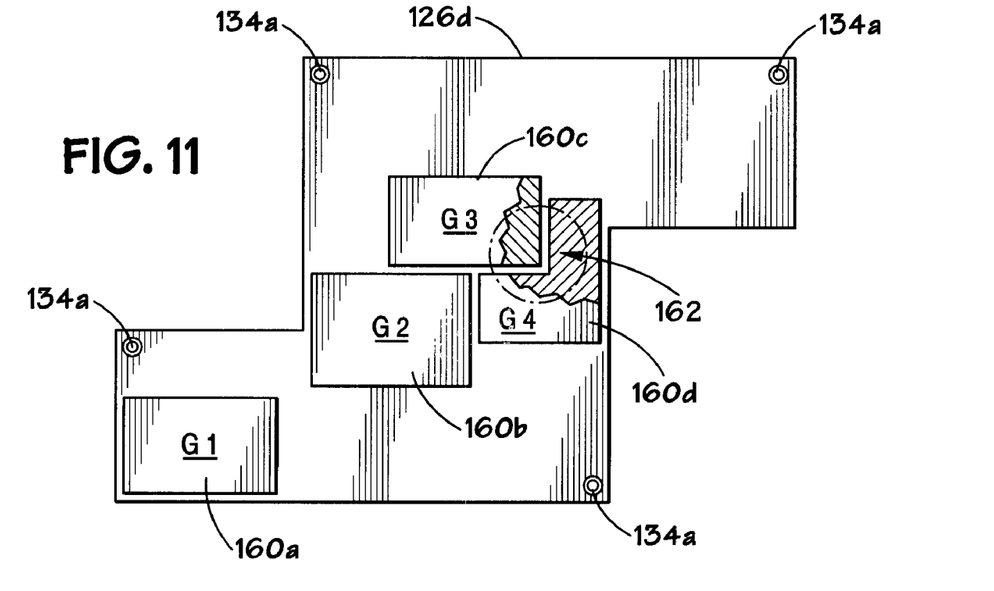
FIG. 11 is an example of an embodiment of one of the G (grounding) layers of the motherboard.

Referring now to FIG. 11, shown is an example of an embodiment of a G layer or grounding layer of the PCB (120). FIG. 11 is a downward plan view of a grounding layer, such as G1 (126d). It should be noted that in this preferred embodiment, the device grounding layer (G-layer) sections mirror the P or power layer sections. For example, there are various grounding areas G1–G4, which are analogous, respectively, to those voltage areas V1–V4 previously described in conjunction with FIG. 9. Thus, the ground fields (160a–160d) correspond with grounding areas G1–G4 respectively and are analogous to the voltage fields (140a–140d), of FIG. 9. Additionally note the plated metallic holes (134a) located in various corners of each of the G layer, which were previously shown in FIG. 8. The purpose of these plated metallic holes is to electrically connect each of the digital ground layers to system ground.

Figure 12:
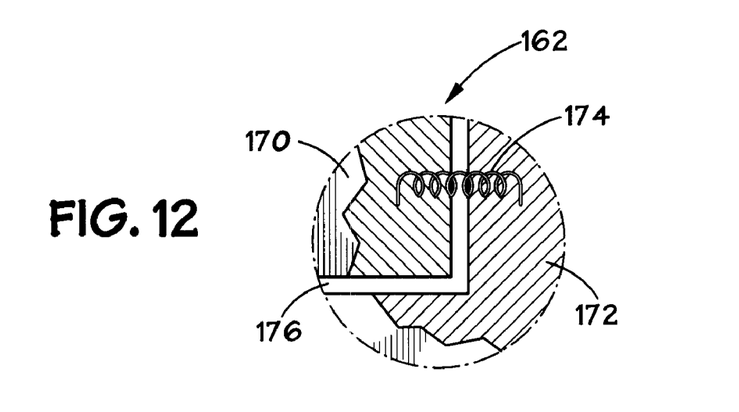
FIG. 12 is an enlarged view of an area included within one of the G layers shown in FIG. 11.

Referring now to FIG. 12, shown is an enlarged view of area 2 (162) previously shown in FIG. 11. Area 2 (162) is similarly analogous to area 1 of FIG. 10. Area 2 (162) is an enlarged plain view of a portion of a G layer, such as layer (126d). Area 2 comprises a portion (170) of G3 section, which is AGND or analog ground for the analog devices. Area 2 also contains a portion of area G4 (172), which serves as DGND or digital ground for the digital devices. As previously described in conjunction with the P layer, an inductor (174) or other equivalent is used to electrically connected each of the portions of the G portions, such as G3 and G4, to produce a dampening effect of any noise produced by the various devices mounted on the PCB (120). Also included is ground plane separator (176) to separate the various G sections as previously described in conjunction with FIG. 10 to separate the various voltage areas.

Advantages of the invention are apparent in the use of the HiNote Ultra 2000 computer system, by Digital Equipment Corporation, which includes the previously described embodiment of the invention. In accordance with FCC rules and regulations, the HiNote Ultra 2000 is considered a class B computing device, since it is a personal computer that may be used in a home environment. The HiNote must comply with the emission limits set forth in CFR 47 Part 15 Subpart B, § 15.109. The threshold field strength of radiated emissions from the HiNote at a distance of 3 meters are set forth as follows in the chart below:

| Frequency of Emission (MHZ) | Field Strength (microvolts/meter) |
|---|---|
| 30–88 | 100 |
| 88–216 | 150 |
| 216–960 | 200 |
| Above 960 | 500 |

The chart above discloses a threshold limit (Field Strength) for a particular EMI rate of leakage (Frequency of Emission). The several configurations of the HiNote were tested using a clock signal rate of 65MHz, and a maximum data transfer rate of 650 megabits/second. The level of the highest radiated emission frequency observed was 650 MHZ. In accordance with the above chart, the highest field strength allowed by the FCC is 200 microvolts/meter.

An initial configuration of the HiNote included a flexprint type cable, rather than the previously described cable embodiment including the invention, to interconnect the transmitter on the motherboard to the receiver on an LCD display panel. Using this initial configuration with the flexprint cable in the HiNote, strength readings were observed of approximately 1259 microvolts/meter, when the threshold level is 200 microvolts/meter. Using the HiNote configuration with the previously described cable of a preferred embodiment of the invention, readings of approximately 100 microvolts per meter were observed for the same threshold level of 200 microvolts/meter. Similar reductions in emission strengths were observed for other frequencies.

The foregoing provides a flexible and efficient technique for providing electrical connections between computer components which minimizes EMI radiation emissions. In the previously described embodiment, this cable provides electrical connections for data transmissions in a small laptop or notebook computer. The foregoing description provides a cable which minimizes EMI radiation emissions while simultaneously requiring a minimum amount of space and providing a high degree of physical flexibility.

Having described preferred embodiments of the invention, it will now become apparent to those skilled in the art that other embodiments incorporating its concepts may be provided. It is felt, therefore, that this invention should not be limited to the disclosed embodiments, but rather should be limited only by the scope of the appended claims.

What is claimed is:

1. A cable bundle comprising:
   a plurality of coaxial cables arranged in a cylindrical forn with a generally circular cross-section, each of the plurality of coaxial cables adapted for transmitting an electrical signal, wherein the plurality of coaxial cables are twisted three times about a center of the cable bundle, each of said plurality of coaxial cable comprising:
   an inner conductor portion;
   a dielectric medium surrounding the inner conductor portion; and
   a conductive shield helically wrapped around the dielectric medium; and
   at least one outer cable layer surrounding the plurality of coaxial cables, wherein the at least one outer cable layer comprises each of iron powder, iron oxide powder, and ferrite particles.

2. The cable bundle of claim 1, wherein said inner conductor portion is a 40 AWG wire.

3. The cable bundle of claim 2 comprising an analog power signal passing through the shield of each coaxial cable producing an electrical shielding layer to reduce EMI emissions from said cable bundle.

4. The cable bundle of claim 3, comprising a printed circuit board in combination with the cable bundle, the printed circuit board comprising a first side and a termination strip disposed on the first side, wherein said analog power signals passing through each coaxial cable are gang terminated to the termination strip on the first side of the printed circuit board.

5. The cable bundle of claim 4, wherein said printed circuit board includes a pin connector mounted on a second side of said printed circuit board opposite said first side, said pin connector providing electrical connections for electrical signals transmitted by one or more of said plurality of coaxial cables and providing electrical connections for signals passing through said respective shields.

6. The cable bundle of claim 5, wherein the thickness of the termination strip is approximately less than one millimeter.

7. The cable bundle of claim 2, wherein said plurality of coaxial cables comprise at least 19 coaxial cables each having an inner conductor portion comprising a 40 AWG wire.

8. The bundle of claim 7, wherein said plurality of coaxial cables comprise a first set of signal lines carrying data and clock signals, a second set of signal lines providing power to a top portion of a notebook computer, and a third set of signal lines providing status display signals to a screen display unit in the top portion of the notebook computer.

9. The cable bundle of claim 2 comprising a digital ground signal passing through the shield of each coaxial cable producing an electrical shielding layer to reduce EMI emissions from said cable bundle.

10. The cable bundle of claim 2 comprising an analog ground signal passing through the shield of each coaxial cable producing an electrical shielding layer to reduce EMI emissions from said cable bundle.

11. The cable bundle of claim 1, wherein the plurality of coaxial cables has a signal data transmission rate of approximately 650 megahertz, and wherein the EMI emissions are no greater than 100 microvolts.

12. The cable bundle of claim 1, wherein the conductive shield comprises a single helix wrapped around the dielectric medium.

13. The cable bundle of claim 1, wherein the conductive shield comprises the outer surface of each coaxial cable.

14. The cable bundle of claim 13, wherein each coaxial cable is twisted together to form a single bundle.

15. The cable bundle of claim 1, wherein the at least one outer cable layer comprises a layer of rubber binding material comprising each of iron powder, iron oxide powder, and ferrite particles.

16. The cable bundle of claim 15, wherein said rubber binding material comprises a neoprene rubber material.

17. The cable bundle of claim 15, wherein said rubber binding material comprises a silicon rubber material.

18. The cable bundle of claim 15, wherein the at least one outer cable layer comprises a material layer surrounding the layer of rubber binding material.

19. The cable bundle of claim 18, wherein said material layer comprises a non-conductive material.

20. The cable bundle of claim 18, wherein said material layer comprises a conductive material.

21. The cable bundle of claim 18, wherein said material layer comprises a first fabric tape.

22. The cable bundle of claim 21, wherein the fabric tape comprises polytetraflouroethylene.

23. The cable bundle of claim 21, comprising a second material layer comprising a second fabric tape.

24. The cable bundle of claim 18, wherein said material layer comprises a conductive tape of nickel plating over a copper-woven fabric.

25. A cable bundle comprising:
    a plurality of coaxial cables arranged in a cylindrical form with a generally circular cross-section, each of the plurality of coaxial cables adapted for transmitting an electrical signal, wherein the plurality of coaxial cables is twisted three times about a center of the cable bundle; and
    a layer of one of neoprene rubber and silicone surrounding said plurality of cables, said one of neoprene rubber and silicone comprising each of iron powder, iron oxide powder, and ferrite particles suspended in a rubber binding material.

26. The cable bundle of claim 25, wherein each of said plurality of cables comprises:
    an inner conductor portion;
    a dielectric medium surrounding the inner conductor portion; and
    a conductive shield helically wrapped around the dielectric medium.

27. The cable bundle of claim 25, wherein said cable bundle has a maximum diameter of approximately 5.0 millimeters.

28. The cable bundle of claim 25, wherein said neoprene rubber tubing has a nominal wall thickness of approximately 1.20 millimeters.

29. The cable bundle of claim 25, wherein said each of said cables included in said cable bundle has an approximate diameter of 0.33 millimeters.

30. The cable bundle of claim 25, further comprises a layer of conductive tape that is approximately 0.55 millimeters.

31. The cable bundle of claim 25, wherein said cable bundle is used in data transmissions operating at a rate of approximately 650 megahertz, and wherein the EMI emissions are no greater than 100 microvolts.

32. A cable bundle consisting of:
    a plurality of coaxial cables arranged in a cylindrical form with a generally circular cross-section, each of the plurality of coaxial cables transmitting an electrical signal, each of said plurality of coaxial cables including:
        an inner conductor portion;
        a dielectric medium surrounding the inner conductor portion; and
        a conductive shield helically wrapped around the dielectric medium; and
    at least one outer cable layer surrounding the plurality of coaxial cables, wherein the at least one outer cable layer comprises each of iron powder, iron oxide powder, and ferrite particles.

33. The cable bundle of claim 32, further consisting of an analog power signal passing through the shield of each coaxial cable producing an electrical shielding layer to reduce EMI emissions from said cable bundle.

34. The cable bundle of claim 32, wherein said at least one outer cable layer consists of a layer of rubber binding material comprising each of iron powder, iron oxide powder, and ferrite particles.

35. The cable bundle of claim 34, wherein said at least one outer cable layer consists of a material layer surrounding said layer of rubber binding material.

36. The cable bundle of claim 35, wherein said material layer consists of a non-conductive material.

37. The cable bundle of claim 35, wherein said material layer consists of a conductive material.

38. The cable bundle of claim 35, wherein said material layer consists of a first fabric tape.

39. The cable bundle of claim 38, wherein the fabric tape consists of polytetraflouroethylene.

40. The cable bundle of claim 38, consisting of a second material layer consisting of a second fabric tape.

41. A cable bundle consisting of:
    a plurality of coaxial cables each of the plurality of cables arranged in a cylindrical form with a generally circular cross-section, each of the plurality of coaxial cables adapted for transmitting an electrical signal; and
    a layer of one of neoprene rubber and silicone surrounding the plurality of cables, the one of neoprene rubber and silicone having each of iron powder, iron oxide powder, and ferrite particles suspended in a rubber binding material.

42. The cable bundle of claim 41, wherein each of said plurality of cables consists of:
    an inner conductor portion;
    a dielectric medium surrounding the inner conductor portion; and
    a conductive shield helically wrapped around the dielectric medium.

43. A cable bundle consisting of:
    a plurality of cables, each of the plurality of cables adapted for transmitting an electrical signal;
    a layer of one of neoprene rubber and silicone surrounding the plurality of cables, the layer having each of iron powder, iron oxide powder, and ferrite particles suspended in a rubber binding material; and
    a material layer surrounding the layer of rubber.

44. The cable bundle of claim 43, wherein the material layer consists of a non-conductive material.

45. The cable bundle of claim 43, wherein the material layer consists of a conductive material.

46. The cable bundle of claim 43, wherein the material layer consists of a first fabric tape.

47. The cable bundle of claim 46, wherein the fabric tape consists of polytetraflouroethylene.

48. A cable bundle consisting of:
    a plurality of cables each of the plurality of cables adapted for transmitting an electrical signal;
    a layer of one of neoprene rubber and silicone surrounding the plurality of cables, the one of neoprene rubber and silicone having each of iron powder, iron oxide powder, and ferrite particles suspended in a rubber binding material;

a first material layer surrounding the layer of rubber; and a second material layer surrounding the first material layer and consisting of a fabric tape.

49. A cable bundle comprising:

a plurality of coaxial cables arranged in a cylindrical forn with a generally circular cross-section, each of the plurality of coaxial cables adapted for transmitting an electrical signal, wherein the plurality of coaxial cables has a signal data transmission rate of approximately 650 megahertz, and wherein the EMI emissions arc no greater than 100 microvolts, each of said plurality of coaxial cable comprising:

an inner conductor portion;

a dielectric medium surrounding the inner conductor portion; and a conductive shield helically wrapped around the dielectric medium; and at least one outer cable layer surrounding the plurality of coaxial cables, wherein the at least one outer cable layer comprises each of iron powders iron oxide powder, and ferrite particles.

50. The cable bundle of claim 49, wherein said inner conductor portion is a 40 AWG wire.

51. The cable bundle of claim 49, comprising an analog power signal passing through the shield of each coaxial cable producing an electrical shielding layer to reduce EMT emissions from the cable bundle.

52. The cable bundle of claim 51, comprising a printed circuit board in combination with the cable bundle, the printed circuit board comprising a first side and a termination strip disposed on the first side, wherein the analog power signals passing through each coaxial cable are gang terminated to the termination strip on the first side of the printed circuit board.

53. The cable bundle of claim 52, wherein the printed circuit board comprises a pin connector mounted on a second side of the printed circuit board opposite the first side, the pin connector providing electrical connections for electrical signals transmitted by one or more of the plurality of coaxial cables and providing electrical connections for signals passing through the respective shields.

54. The cable bundle of claim 52, wherein the thickness of the termination strip is approximately less than one millimeter.

55. The cable bundle of claim 49, wherein the plurality of coaxial cables comprise at least 19 coaxial cables each having an inner conductor portion comprising a 40 AWG wire.

56. The cable bundle of claim 49, wherein the plurality of coaxial cables comprise a first set of signal lines carrying data and clock signals, a second set of signal lines providing power to a top portion of a notebook computer, and a third set of signal lines providing status display signals to a screen display unit in the top portion of the notebook computer.

57. The cable bundle of claim 49, wherein the plurality of coaxial cables are twisted three times about a center of the cable bundle.

58. The cable bundle of claim 49, wherein at least one outer cable layer comprises a layer of rubber.

59. The cable bundle of claim 58, wherein the at least one outer cable layer comprises a material layer surrounding the layer of rubber.

60. The cable bundle of claim 49, wherein the at least one outer cable layer comprises a layer of rubber binding material comprising each of the iron powder, iron oxide powder, and ferrite particles.

61. The cable bundle of claim 60, wherein the rubber binding material comprises a neoprene rubber material.

62. The cable bundle of claim 60, wherein the rubber binding material comprises a silicon rubber material.

63. The cable bundle of claim 49, comprising a digital ground signal passing through the shield of each coaxial cable producing an electrical shielding layer to reduce EMI emissions from the cable bundle.

64. The cable bundle of claim 49, comprising an analog ground signal passing through the shield of each coaxial cable producing an electrical shielding layer to reduce EMI emissions from the cable bundle.

65. The cable bundle of claim 49, wherein the conductive shield comprises a single helix wrapped around the dielectric medium.

66. The cable bundle of claim 49, wherein the conductive shield comprises the outer surface of each coaxial cable.

* * * * *